United States Patent [19]

Liberman

[11] 4,297,966
[45] Nov. 3, 1981

[54] VALVE INDICATOR POST

[76] Inventor: Richard Liberman, 4400 Montclair Ave., Montreal, Quebec, Canada

[21] Appl. No.: 85,141

[22] Filed: Oct. 15, 1979

[30] Foreign Application Priority Data

Oct. 18, 1978 [CA] Canada .................................. 313675

[51] Int. Cl.³ ............................................ F16K 37/00
[52] U.S. Cl. ..................... 116/277; 137/553
[58] Field of Search ......................... 116/277; 137/556

[56] References Cited

U.S. PATENT DOCUMENTS

| 2,930,344 | 3/1960 | Brasel | 116/277 |
| 3,238,915 | 3/1966 | Smith et al. | 116/277 |
| 3,482,596 | 12/1969 | Jones | 137/556 |
| 3,554,160 | 1/1971 | Fortune | 116/277 |
| 3,804,056 | 4/1974 | Lee et al. | 116/277 |
| 4,133,288 | 1/1979 | Burgess | 116/277 |

Primary Examiner—Daniel M. Yasich

[57] ABSTRACT

An indicator post is disclosed for an underground valve or a valve within a building. The indicator post is an improvement over existing units because it has panoramic windows allowing viewing from almost 360° around the post and includes readily positionable targets for different types of valves. The indicator post has a detachable cap mounted on an outer casing, a rotatable stem member in the casing adapted to be converted to an operating stem of the valve, at least two curved viewing ports extending in a single curve around the cap, a curved target carrier within the cap, at least one flexible target strip having a valve position indication thereon, adapted to be wrapped about a portion of an outer surface of the target carrier and visible through the viewing ports for almost 360° around the post. Fastening means are also provided extending over at least a portion of the axial length of the target carrier for fastening the strip anywhere along the portion of the axial length of the target carrier, and means for moving the target carrier past the viewing ports when the stem member is rotated to operate the valve thus moving the target strip to or from the viewing ports.

7 Claims, 7 Drawing Figures

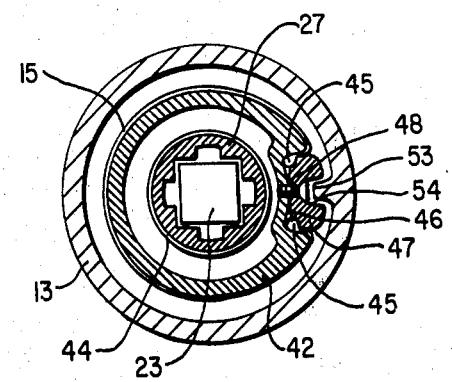
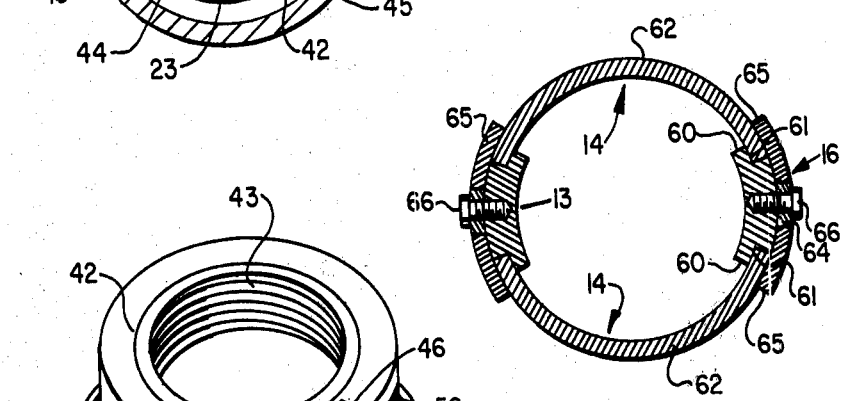
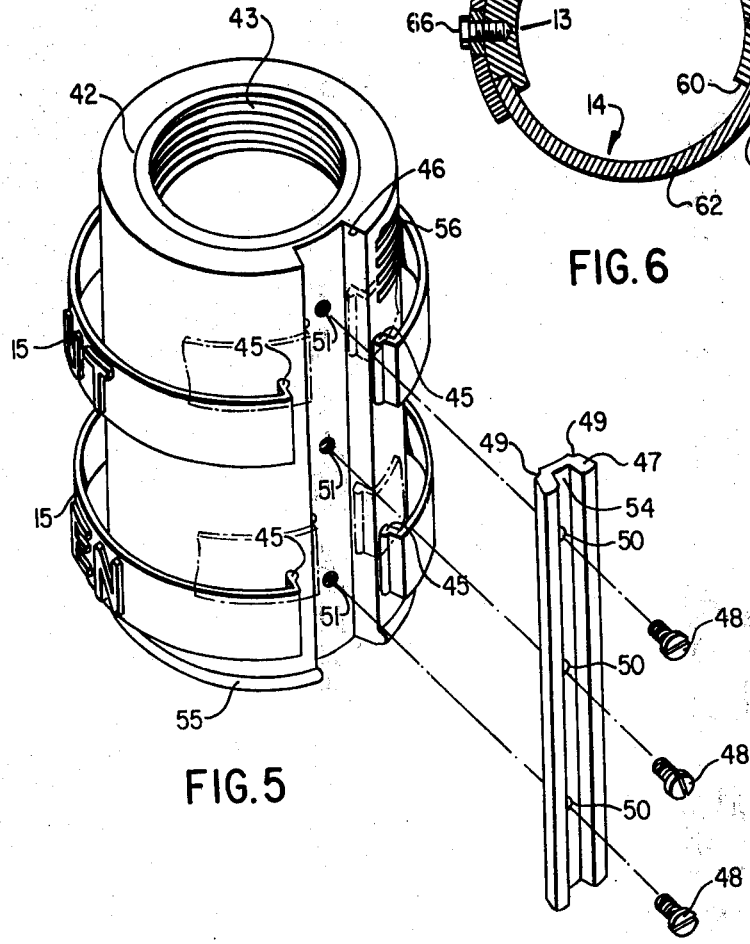

VALVE INDICATOR POST

BACKGROUND OF THE INVENTION

This invention is directed toward an improved indicator post for an underground valve or a valve within a building and components for the improved indicator post.

Underground valves are employed in various industrial applications, such as main water lines, sprinkler systems, water cooling systems, etc. Such lines and systems are underground to avoid frost damage and have an operator member above ground in the form of an indicator post which operates such underground valves and indicate the position of the valves, that is whether the valves are open or shut. The indicator post has a stem member which extends from above the ground to connect to the stem of the underground valve so that the valve can be operated from above ground. The post also has a window above ground in which a target with the words "open" or "shut," or other words with a similar meaning, appear to indicate the position of the hidden valve. In other situations, valves are sometimes located within buildings or special housings, and it is required to have an operating member outside the building. In such a situation an indicator post may be wall mounted with a horizontal stem member.

The known indicator posts generally are expensive to manufacture and have the valve position indicators or targets with words thereon adjustable because the number of rotations of the valve stem between open and shut valve positions varies depending on the valve used, and thus the distance between the open indicator and the shut indicator may be different for each type of valve. Thus most indicator posts require a means for adjusting the position of these targets so the indicator posts suit many type of valves.

The known indicator posts also have relatively expensive viewing windows, employing specific window frames and gaskets. The known windows are usually flat thus limiting the viewing field so that a viewer has to be almost exactly in front of the window in order to read the valve position indicator. Furthermore, since most of these flat windows have their edges projecting somewhat from the casing of the post, they can be easily damaged if the post is accidently hit.

SUMMARY OF THE INVENTION

It is the purpose of the present invention to provide an improved indicator post which is simpler in construction, and thus less expensive to manufacture, than known posts.

Another purpose of the present invention is to provide an improved indicator post with panoramic viewing ports which allow the valve position indicators to be seen from almost 360° around the post.

It is yet another purpose of the present invention to provide an improved indicator post having targets with valve position words thereon that can be simply, adjustably, mounted on the post to suit a variable number of rotations of the operating stem for each installation requirement. The targets bearing the valve position indications or words are readily positioned to suit each installation and then simply locked in position.

A further purpose of the invention is to provide a novel indicator display assembly which could be incorporated in known indicator posts. The assembly includes readily positionable targets carrying valve position words.

It is a still further purpose of the present invention to provide an improved indicator post having simplified, strong windows, with simple means for mounting the windows. The windows provided are well protected and provide easier viewing of the targets carrying the valve position words.

The invention is particularly directed toward an indicator post for operating a remote valve and indicating its position, the post having a detachable cap mounted on an outer casing, a rotatable stem member in the casing adapted to be connected to an operating stem of the valve, at least two curved viewing ports extending in a single curve around the cap, a curved target carrier within the cap, at least one flexible target strip having a valve position indication thereon, removably wrapped about a portion of an outer surface of the target carrier and visible through the viewing ports for almost 360° around the post, fastening means extending over at least a portion of the axial length of the target carrier for fastening the strip anywhere along the portion of the axial length of the target carrier, and means for moving the target carrier past the viewing ports when the stem member is rotated to operate the valve, thus moving the target strip to or from the viewing ports.

In a preferred embodiment the indicator post has two flexible target strips, a first strip mounted on the outer surface of the target carrier in a position where it indicates through the ports that the valve is closed, and a second strip mounted on the outer surface of the target carrier in a position where it indicates through the ports that the valve is open. In yet another embodiment, co-operating screw thread means are provided on the target carrier and the rotatable stem member for moving the target carrier axially past the viewing ports, disengaging means are also provided wherein the co-operating screw thread means disengages when the target carrier attempts to pass a top or bottom position, and re-engaging means are provided wherein the co-operating screw thread means re-engages when the target carrier passes into the range within the top and bottom position.

In yet another embodiment, the two curved viewing ports extend in a single curve around a cylindrical portion of the cap with a curved window within the ports and a projecting rib extending around the cap above and below the viewing ports.

BRIEF DESCRIPTION OF THE DRAWINGS

The invention will now be described in detail having reference to the accompanying drawings which illustrate embodiments of the invention.

FIG. 4 is a cross-sectional view taken along line 4—4 in FIG. 3.

FIG. 5 is an exploded isometric view of the target carrier with two target strips.

FIG. 6 is a cross sectional view through the viewing ports of the post taken along line 5—5 in FIG. 3 with the target carrier and stem member omitted.

DESCRIPTION OF THE PREFERRED EMBODIMENTS

Figures 1, 2:
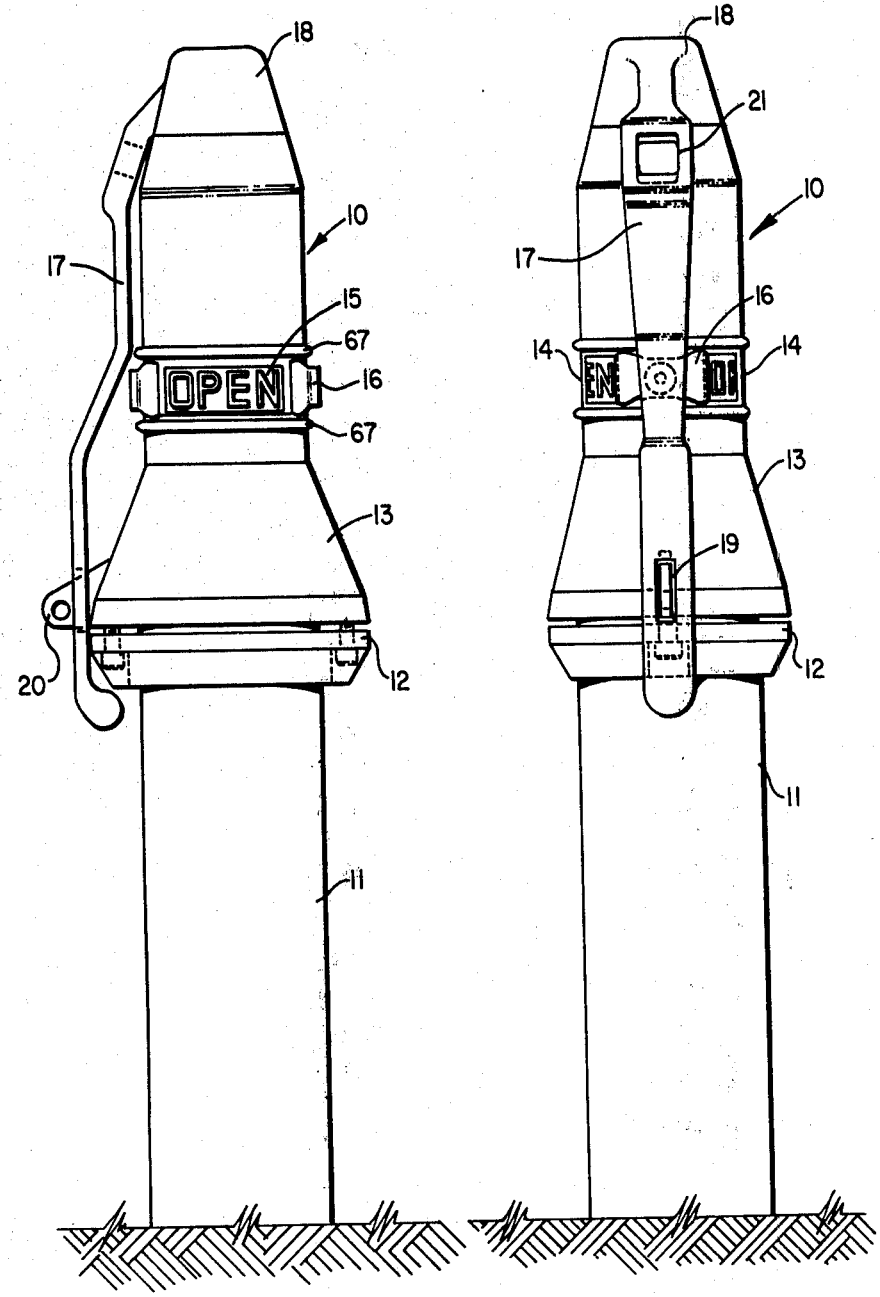
FIG. 1 is a front elevational view of an indicator post of the present invention with the stem mounted vertically for an underground valve.
FIG. 2 is a side elevation of the indicator post shown in FIG. 1.

The indicator post 10 shown in FIGS. 1 and 2 is used to operate an underground valve (not shown). The post 10 has an outer generally cylindrical casing 11 which is connected at its bottom end to the bonnet of the valve. The casing 11 extends upright above the ground to a retainer flange 12 which supports a cap 13. Approximately midway up the cap are two curved viewing ports 14 through which a target strip 15 is visible. The viewing ports 14 extend in a single curve or circle around the cap 13 and have two port clamps 16, 180° apart around the circle. The port clamps 16 extend for only a short distance and allow a target strip 15 to be seen for almost 360° around the indicator post 10. As can be seen in FIG. 2 when one of the port clamps 16 is directly facing a viewer, it is still possible to pick out the letter 'N' on the left side of the target strip 15 and the letter 'O' on the right side. Thus a viewer would know that the target strip 15 indicates OPEN. If the valve was shut, then the target strip 15 would indicate the letter 'T' on the left side and 'S' on the right side.

Figure 3:
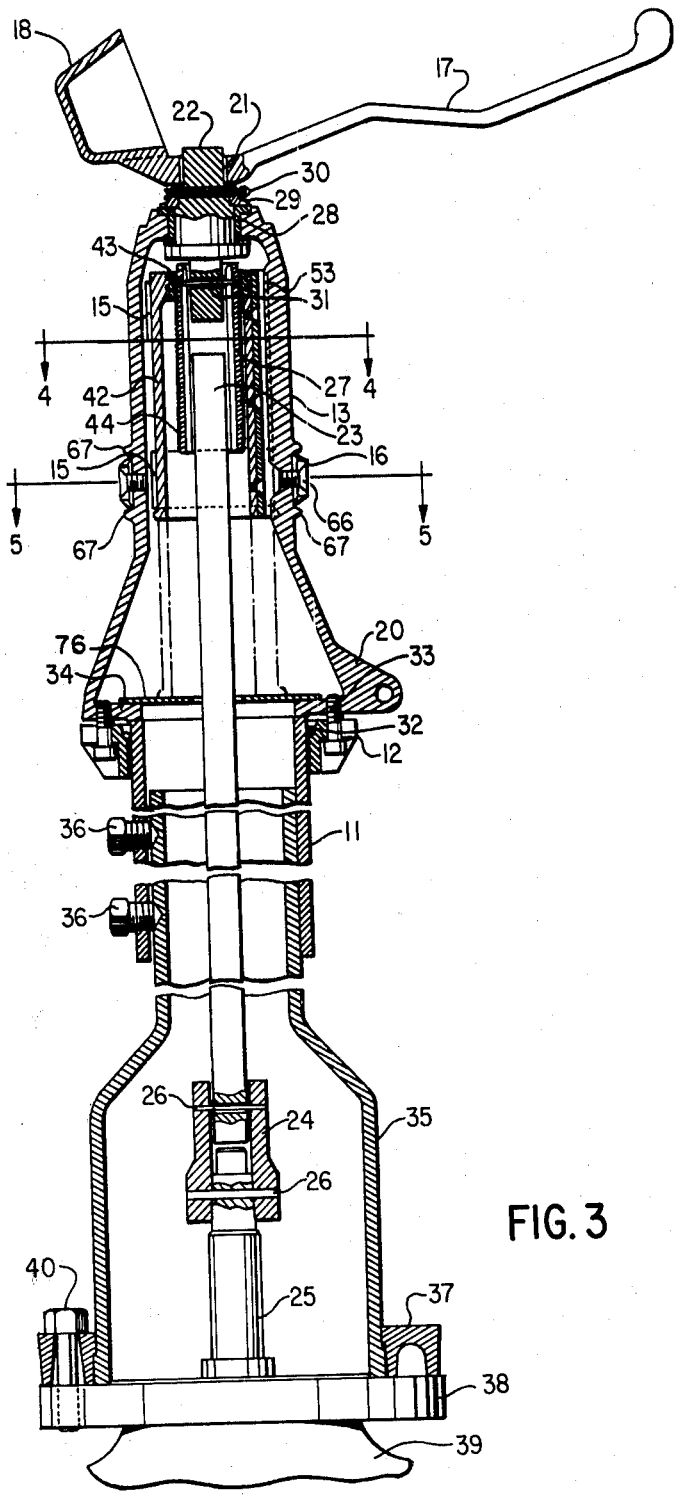
FIG. 3 is a longitudinal cross-sectional view of an indicator post of the present invention showing cap, casing, and lower section joined to the bonnet of a valve.

A wrench 17 is formed integrally with a conical top cover 18 which fits on the top of the cap 13. The end of the handle of the wrench 17 has a slot 19 which fits over a locking tab 20 formed integrally with the cap 13. Thus when the wrench 17 is locked to the cap 13, the position of the valve cannot be moved. FIG. 3 shows the wrench 17 removed from the cap 13 and the wrench socket 21 engaged with the squared end of the stem adaptor 22. Rotation of the wrench 17 opens or closes the valve and moves the target strip 15 from the viewing ports 14.

FIG. 3 shows the complete valve indicator post wherein an extension stem member 23 is connected at its lower end via an extension stem coupling 24 to a valve stem 25. The extension stem coupling 24 is connected by pins 26 to both the extension stem member 23 and the valve stem 25.

The upper end of the extension stem member 23 is connected, via a cylindrical operating member 27 to the stem adapter 22 which is rotatably mounted in a stem adaptor bearing 28 on the upper surface of the cap 13. The stem adapter 22 rotates but cannot move vertically relative to the cap 13 because it is held in place by a retaining nut 29 on top of the stem adapter bearing 28 and a pin 30 through the retaining nut 29 and stem adapter 22. The operating member 27 is connected to the lower portion of the stem adapter 22 by a pin 31 thus the operating member 27 can rotate, but has no vertical movement relative to the cap 13. The operating member 27 has a substantially square interior cross section as illustrated in FIG. 4, and this engages with a squared top portion of the extension stem member 23. The top of the extension stem member 23 is a loose sliding fit within the operating member 27 thus allowing for considerable vertical tolerance and misalignment for installation of the indicator post 10. The weight of the extension stem member 23 is supported by the valve stem 25.

When the stem adapter 22 is rotated by the wrench 17, the valve stem 25 is also rotated via the extension stem coupling 24, extension stem member 23 and the operating member 27, to open or close the valve depending on the direction of rotation of the stem adapter 22.

The cap 13 may be removed from the casing 11 to allow for some adjustments during installation of the post 10 and also to allow for access to the interior top portion of the post. The casing 11 is formed from a standard pipe section whose length is determined by the distance between the viewing ports 14 and the valve. In the case of an underground valve, it is preferable to have the centre of the viewing ports two and a half feet above ground level. At the top of the casing 11 the retainer flange 12 is held to the casing 11 by a holding ring 32. Cap screws 33 connect the retainer flange 12 to a lower flange 34 of the cap 13. A metal to metal join occurs between the casing 11 and the cap 13 to prevent dust and snow entering the indicator post. The casing 11 extends downwards and a lower section 35 has a top portion with a smaller diameter than the inside diameter of the casing 11 and fits within the casing 11 in a telescopic relationship. The casing 11 is held to the lower section 35 by two set screws 36. The lower section 35 has drill points made at the time of installation to hold the casing 11 in place. The lower portion of the lower section 35 has a larger diameter than the top portion and at its lower end has a retainer flange 37 which holds the lower section 35 to the flange 38 of a valve bonnet 39 by means of cap screws 40.

The indicator post 10 is constructed to indicate positively whether a valve is open or closed. To this end, a curved target carrier 42 is mounted inside the cap 13 concentrically over the cylinder operating member 27. At the top of the inner surface of target carrier 42 is an internal threaded portion 43 which engages with the external thread 44 extending from near the top to the outer surface of bottom of the operating member 27. This external thread 44 terminates before the top edge of the operating member 27 such that when the target carrier 42 is in the highest position the internal threaded portion 43 does not engage the external thread 44 on the operating member 27, but rests on this thread.

An annular space exists between the external surface of the target carrier 42 and the interior surface of the cap 13. Two valve position target strips 15 are mounted on the target carrier 42. Each target strip 15 is flexible and thus can be wrapped around the target carrier 42. At each end of the target strips 15 are thickened portions 45 as illustrated more clearly in FIG. 5 for holding the ends of the strips 15 when wrapped around the target carrier 42. The strips 15 are preferably formed from thermo plastic material. The upper target strip 15 has the word "shut" in raised letters thereon at least twice and the lower strip 15 the word "open." The letters are sized to be viewed through the viewing ports 14. Raised letters are preferred because they are still visible even when coated with dust or powder.

A longitudinal slot 46 extends for the full length of the outer surface of the target carrier 42. A rigid wedge block 47 fits within the slot 46. Screws 48 hold wedge block 47 in slot 46. The target strips 15 are mounted about the target carrier 42 in the desired vertical position and their thickened portions 45 are turned into the slot 46. Wedge block 47 is then firmly fastened in the slot 46 with the thickened portions 45 of the target strips 15 fitting into grooves 49 on each side of the wedge block 47. When the screws 48 are inserted through the holes 50 in the wedge block 47 and screwed into tapped holes 51 in the bottom of the slot 46, the target strips are tightened and held in place. The target strips 15 may be located at different vertical positions along the length of the target.

A vertical rib 53 is provided on the inner surface of the cap 13 for the full movement of the target carrier 42. A longitudinal groove 54 in the wedge block 47 extends for the full length of the target carrier. When the cap 13 is on the indicator post 10, the rib 53 engages in the groove 54. Thus when the operating member 27 rotates and the external thread 44 engages with the internal threaded portion 43 of the target carrier 42, the carrier 42 moves axially, i.e., vertically up or down, but cannot rotate in the cap 13. In a preferred embodiment, the wedge block 47 is made from a plastic material such as nylon to reduce friction when the target carrier 42 moves up and down.

If the internal threaded portion 43 of the target carrier 42 moves right up off the top end of the external thread 44 on the operating member 27 when rotating the stem adapter 22, the internal threaded portion 43 merely sits stationary on top of the external thread 44. Then when rotating the stem adapter 22 in the opposite direction, the weight of the target carrier 42 causes the internal threaded portion 43 to immediately re-engage the external thread 44 on the operating member 27.

In FIG. 3, the target carrier 42 is shown in its uppermost position with the lowest position indicated in chain dotted lines. When in the lowest position, the bottom edge of the target carrier 42 rests on a sheet metal or resilient strip 76 which extends across the flange 34 at the bottom of the cap 13. If the internal threaded portion 43 of the target carrier 42 moves right down off the bottom end of the external thread 44 on the operating member 27 when rotating the stem adapter 22, the carrier compresses resilient strip 76. Then when rotating the stem adapter 22 in the opposite direction the resilient strip 76 expands pushing the target carrier 42 upwards so the internal threaded portion 43 re-engages the external thread 44 on the operating member 27 and the target carrier 42 moves upwards.

It will be seen that the indicating post can be readily set to indicate the open and closed positions of different valves. The indicator post 10 can be mounted on the valve in location and the cap 13 can be removed to provide access to the target carrier 42 so that upper and lower target strips 15 are positioned so that the lower "open" stip 15 is opposite the viewing ports 14 when the valve is open and the upper "shut" strip 15 is opposite the viewing ports 14 when the valve is closed. The distance between the strips 15 is determined by the number of turns needed to operate the valve from fully open to fully closed. For some valves, only a few turns, and thus a short distance, is required between open and closed portions. For other valves many turns, and thus a relatively long vertical distance is required. The target strips 15 are positioned as above, and then clamped to the target carrier 42 by wedge block 47. The cap 13 is then replaced.

In a preferred embodiment a lower lip 55 is provided on the bottom edge of the target carrier 42. The lower target strip 15 is positioned around the target carrier 42 touching the lower lip 55 and a plurality of notches 56 are shown evenly spaced apart vertically on the side of the target carrier 42. The space between two notches 56 represents five turns of the operating member 27 and this aids in positioning the upper target strip 15.

The indicator post 10 of the present invention is provided with novel windows for covering the viewing ports 14. As shown in FIG. 6, each viewing port 14 is recessed at its ends 60 inwardly from the outer surface of the cap 13. The recesses provide shoulders 61 upon which curved windows 62 sit to close the ports 14. Each window 62 is a semi-cylindrical pane preferably made from a suitable transparent, high strength, thermo plastic material, such as polycarbonate, and is curved to have the same curvature as the outer surface of the cap 13. Two port clamps 16 are provided one at adjacent ends 60 of both viewing ports 14. The clamps 16 have a central body portion 64 and two curved arms 65 extending laterally from both sides of the body portion 64. The body portion 64 is fastened to the outside of the cap 13 with the arms 65 extending past the ends 60 of the ports 14 to clamp the ends of both window panes 62 against shoulders 61.

A pair of protecting ribs 67 are located one just above viewing ports 14 and one just below. Both ribs 67 are in the form of circular rings and protect the windows 62 from damage from most blows to the post.

Figure 7:
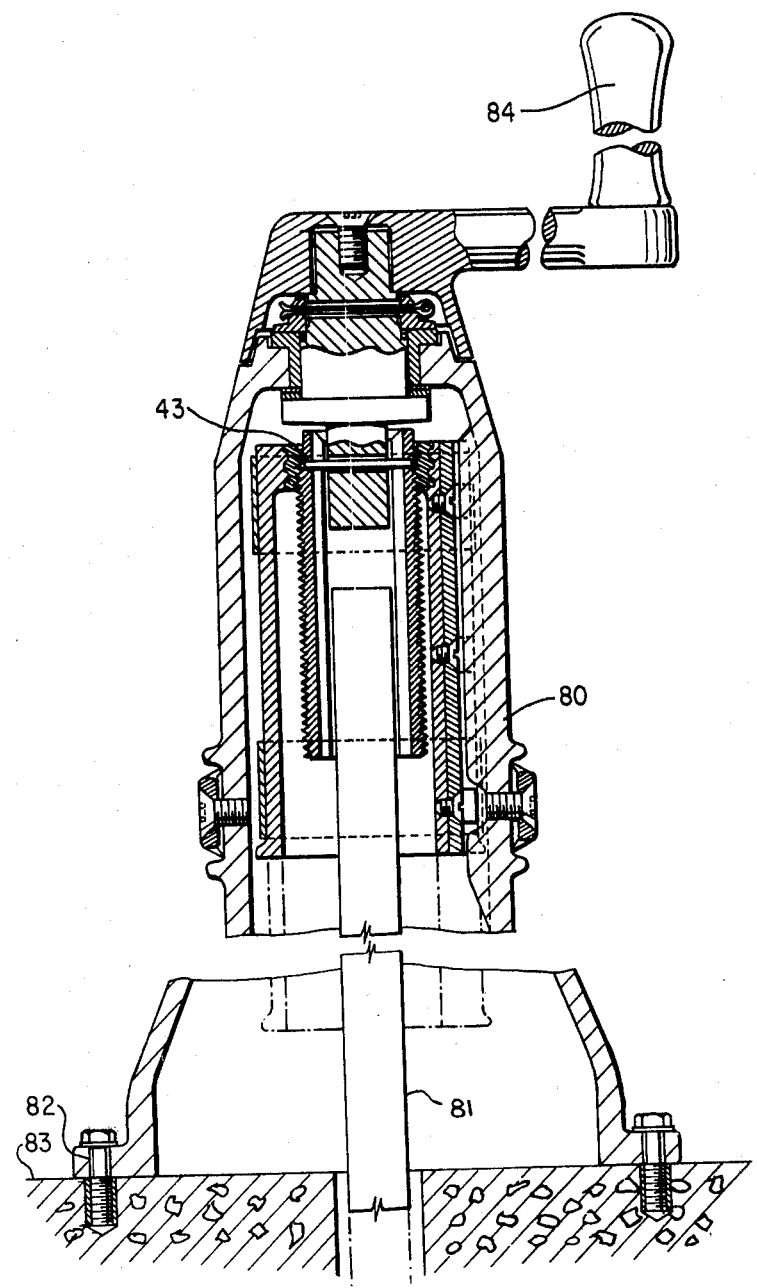
FIG. 7 is a longitudinal cross-sectional view of an indicator post of the present invention with the stem member mounted horizontally passing through a wall.

FIG. 7 shows another embodiment of an indicator post 80 wherein the post is mounted with the extension stem 81 in a horizontal position, and a flange 82 on the end of the indicator post 80 is mounted on a concrete wall 83. The valve is not shown but may be inside a building. Thus the valve may be operated without entering the building. The integral wrench and conical top cover shown in FIGS. 1, 2 and 3 is replaced with a fixed handle 84. All other elements of the indicator post 80 are the same as previously described.

It will be apparent to those skilled in the art that various changes may be made to the particular embodiments of the indicator post illustrated and described in detail herein without department from the scope of the present invention which is limited only by the claims that follow.

The embodiments of the invention in which an exclusive property or privilege is claimed are defined as follows:

1. An indicator post for operating a valve stem of a remote valve and for indicating the position of the valve, said post comprising:
  a cylindrical outer casing having a detachable cap, the cap having at least two curved viewing ports extending in a single curve therearound and having an upper surface;
  a rotatable stem adapter positioned through the upper surface;
  an operating member in the cap connected to said stem adapter for rotation therewith;
  a stem member in the casing linking for rotation said operating member to the valve stem;
  a curved target carrier located in the cap, said carrier adapted to move axially within the cap in response to rotation of said operating member, said carrier having an outer surface;
  a first and a second target strip, each strip having a valve position indication thereon with the indication on said first strip different from the indication on said second strip, said first and second strips removably wrapped about the outer surface;
  fastening means for mounting said first and second strips in any vertical position along the axial length of the outer surface with said second strip at a location on the outer surface different from the location of said first strip; and,
  means for axially moving said carrier and said first and second strips past the viewing ports as said stem adapter is rotated, with said means threadably engaging said carrier to said operating member whereby when either said first or said second strip is in alignment with said ports the valve position indication thereon is visible for almost 360° around said post.

2. The indicator post as claimed in claim 1 wherein the cap is cylindrical for at least a portion of its length and at least two curved windows, with one window covering each viewing port, the windows comprise semi-cylindrical panes covering the semi-cylindrical viewing ports, projecting ribs on the cap extending in circular rings, one above the one below the semi-cylindrical viewing ports and including two clamps each between different adjacent ends of the two panes with each clamp holding one end of each pane in place on the cap by fastening means.

3. The indicator post as claimed in claim 2 wherein the two panes are made from a transparent polycarbonate material.

4. The indicator post as claimed in claim 1, wherein said target carrier is prevented from rotating within the cap, and is mounted about said operating member, and said means for axially moving said target carrier past the viewing port comprises co-operating screw thread means on said target carrier and said operating member.

5. The indicator post as claimed in claim 4 wherein the co-operating screw thread means moves said target carrier in a range between a top position and a bottom position with the cap, and includes disengaging means wherein the co-operating screw thread means disengages when said target carrier attempts to pass the top or bottom position and re-engaging means wherein the co-operating screw thread means re-engages when said target carrier passes into the range within the top and bottom position.

6. The indicator post as claimed in claim 1 wherein said fastening means comprises a longitudinal slot extending axially on the outer surface of said target carrier, a wedge block fitting in the slot to clamp the ends of said target strips in the slot, and means for detachably fastening the block within the slot.

7. An indicator post for operating a valve stem of a remote valve and for indicating the position of the valve, said post comprising:
a cylindrical outer casing having a detachable cap, the cap having at least two curved viewing ports extending in a single curve therearound and having an upper surface;
a rotatable stem adapter positioned through the upper surface;
a cylindrical operating member in the cap connected to said stem adapter for rotation therewith, said operating member having an outer surface with an external thread thereon;
a stem member in the casing linking for rotation said operating member to the valve stem;
a curved target carrier located in and adapted to move axially within the cap, said carrier having an outer surface and an inner surface with an internal threaded portion;
at least one flexible target strip having a valve position indication thereon, said strip removably wrapped about the outer surface;
fastening means for mounting said strip in any vertical position along the axial length of the outer surface;
and,
the internal threaded surface portion adapted to co-operate with the external thread to provide means for axially moving said carrier and said strip past the viewing ports as said stem adapter is rotated,
whereby when said strip is in alignment with said ports the valve position indication thereon is visible for almost 360° around said post.

* * * * *